United States Patent
Logsdon

[15] 3,684,220
[45] Aug. 15, 1972

[54] PIPE HOLDER

[72] Inventor: Duane D. Logsdon, 1719 Canyon Rd., Fullerton, Calif. 92633

[22] Filed: Nov. 19, 1970

[21] Appl. No.: 91,070

[52] U.S. Cl..........................................248/56, 16/2
[51] Int. Cl..................................................F16l 5/00
[58] Field of Search..248/56; 16/2; 174/65 G, 152 G, 174/153 G

[56] References Cited

UNITED STATES PATENTS

| 3,366,356 | 1/1968 | Fisher | 248/56 |
| 3,164,054 | 1/1965 | Biescker | 174/153 G X |
| 3,105,664 | 10/1963 | Poradun | 248/56 |
| 3,580,988 | 5/1971 | Orlowski | 16/2 |
| 2,578,809 | 12/1951 | Ketchum | 174/152 G X |

Primary Examiner—Chancellor E. Harris
Attorney—Edward D. O'Brian

[57] ABSTRACT

A pipe holder for use in holding a pipe relative to a structural member can be formed so as to include a plurality of segments, each of which corresponds to part of a cylinder and hinge means connecting these segments so that they can be opened to fit around a pipe. The segments preferably include holding means on their exteriors for engaging a structural member, rib means on their interiors for engaging a pipe and flanges on their adjacent ends for mounting the holder with respect to a structural member. An entire holder is preferably formed as a unitary body out of a polyolefin such as polypropylene.

1 Claim, 5 Drawing Figures

PATENTED AUG 15 1972 3,684,220

INVENTOR
DUANE D. LOGSDON
BY
EDWARD D. O'BRIAN
ATTORNEY

PIPE HOLDER

BACKGROUND OF THE INVENTION

The invention described in this specification pertains to pipe holders for use in holding or mounting pipes with respect to structural members. From this it will be apparent that the present invention pertains to a field which is old and well-established. Various different means for holding or mounting pipes have been known since virtually the advent of of plumbing. The plumbing field, is however, rapidly changing as the result of a number of different factors and considerations.

For reasons which are unimportant as far as the present invention is concerned, copper and copper alloy pipe or tubing is being increasingly used in place of older types of pipe. Such tube or pipe is particularly being used more and more extensively for lines employed in conveying hot water. Such pipe as used normally employs as thin a wall thickness as will provide the necessary structural ability to withstand the water pressures to which such pipe will be subjected.

In connection with the utilization of copper tube or pipe a number of distinct problems have been encountered. It has been found difficult to mount such pipe on structural members such as studs, headers or the like without damaging such pipe. It is considered that there is a considerable danger of such damage in mounting this type of pipe because of the usual thin wall thickness of this type of pipe. Copper tubing or pipe also has to be mounted in such a manner as to accomodate heat-caused expansion and contraction because copper expands and contracts significantly with temperature change. If this type of pipe is improperly held during use dimensional changes in it can result in physical damage.

Other factors are involved in this utilization of copper tube and pipe. Because of the inherent characteristics of copper this type of pipe tends to transmit or convey sounds such as result from fluid movement to a significant extent. This type of pipe also will tend to convey or transmit heat. In modern buildings having comparatively thin partitions or walls such transmission of sound and heat can be relatively disadvantageous. Further, copper tube or pipe must be mounted so as to avoid contact with other metals such as have been used in prior pipe holders and are used in some building structural members to avoid damage as the result of electrolysis or galvanic action.

SUMMARY OF THE INVENTION

A broad objective of the present invention is to provide new and improved pipe holders. A more specific objective of the present invention is to provide pipe holders to fullfil an existing need for pipe holders which can be satisfactorily utilized in mounting copper and similar pipe or tubing. It is not to be assumed from this that the pipe holders of the present invention can only be used or are intended to be used only with copper tubing or pipe. They can be advantageously employed in mounting other types of lines as may be desired.

A further objective of the present invention is to provide pipe holders for mounting purposes as herein described which are relatively inexpensive to manufacture using present high-speed injection molding techniques and present-day polymer materials. A related objective of the invention is to provide pipe holders as herein indicated which are also advantageous in that they may be easily and conveniently used by a plumber in mounting a pipe with respect to various different types of building structural members or the like.

These various objectives are achieved in accordance with this invention by providing a pipe holder for use in holding a pipe relative to a structural member having a plurality of segments, each corresponding to a part of a cylinder. Except along two of their edges these segments are attached to one another along adjacent edges by hinge means permitting the segments to be spread to an open position from which the holder may be located to surround a pipe. These segments preferably include holding means for engaging a structural member, rib means for holding a pipe and flanges for use in mounting the pipe holder.

BRIEF DESCRIPTION OF THE DRAWING

The invention is best more fully described by reference to the accompanying drawing in which.

Figure 1:
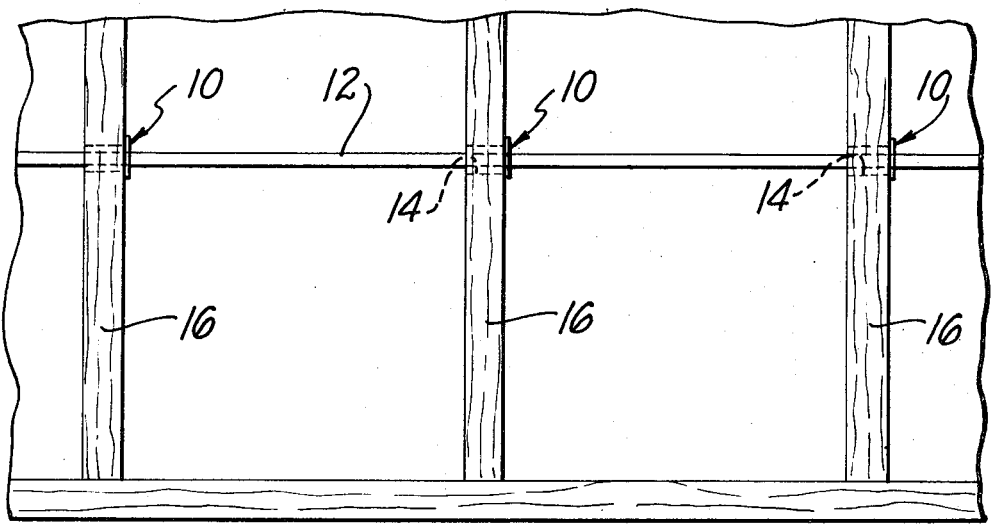
FIG. 1 is a side-elevational view indicating the use of pipe holders of the present invention.
Figure 2:
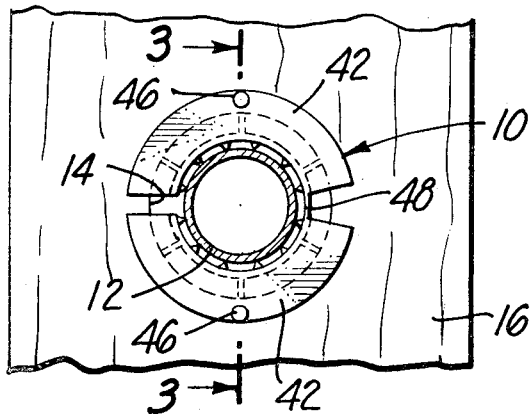
FIG. 2 is a partial cross-sectional view taken at line 2—2 in FIG. 1 of the drawing showing one of the pipe holders illustrated in FIG. 1.
Figure 3:
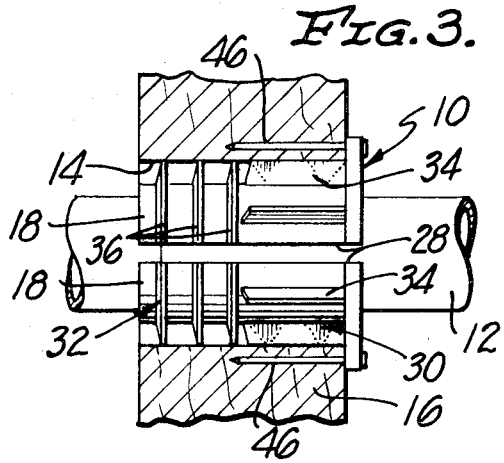
FIG. 3 is a partial cross-sectional view taken at line 3—3 in FIG. 2 showing the pipe holder illustrated in FIG. 2 elevation.
Figure 4:
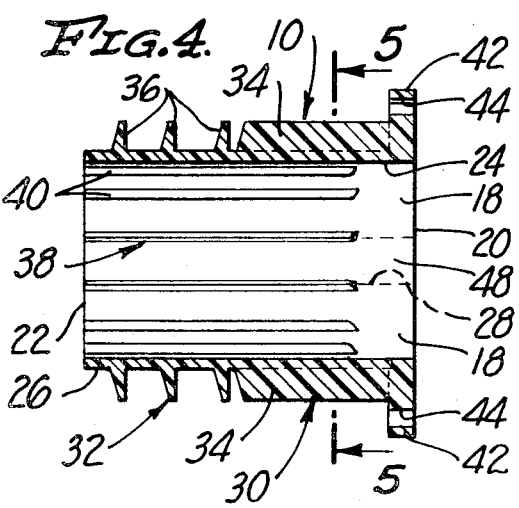
FIG. 4 is a cross-sectional view showing the pipe holder illustrated in the preceding FIGS. 2 and 3 apart from any other structure in section a long the direction of line 3—3 in FIG. 2.

The accompanying drawing is primarily intended to illustrate for explanatory purposes a presently preferred embodiment or form of a pipe holder of this invention. It will be realized from this that the drawing is not to be taken as limiting the invention in any respect. The essential features or principles of this invention defined in the appended claims may be embodied within other somewhat differently constructed and/or somewhat differently appearing pipe holders through the use or exercise of routine engineering skill or ability.

DETAILED DESCRIPTION OF THE PREFERRED EMBODIMENT

In the drawing there are shown a plurality of identically formed pipe holders 10 of the present invention used to support a pipe 12 such as a piece of rigid copper tubing so that this pipe 12 extends through holes 14 in vertically extending wood studs 16 such as may be employed in a building. It is not to be assumed from this that the holders 10 can only be employed in this manner. They can be utilized, and are intended to be utilized in supporting pipes such as the pipe 12 vertically by extending through holes in horizontally extending structural members corresponding to the studs 16. Such structural members may be out of any convenient material such as wood or metal.

As illustrated in FIGS. 2-5 of the drawing, a pipe holder 10 of the present invention is preferably composed of two segments 18, each of these segments 18 has ends 20 and 22, an internal cylindrically shaped surface 24, and external cylindrically shaped surface 26 and side edges 28. The external surfaces 26 are formed so as to include two different sets of holding means 30 and 32. The holding means 30 consists of spaced parallel projecting fins 34 extending approximately half-way along the length of the surfaces 26. The holding means 32 consists of similar parallel, circumferential fins 36. These fins 36 are spaced from one another and are located on portions of the surfaces 26 which are not occupied by the fins 34. The fins 34 and 36 preferably extend from the surfaces 26 the same distance.

Since the fins 34 extend longitudinally of the segments 18 they can conveniently be utilized in holes in comparatively thin structural members. When, however, the pipe holder 10 is used in a comparatively deep hole in a structural member such as in a stud 16 as indicated both sets of fins 34 and 36 engage the interior of such a hole 14 so as to stablize the holder 10, but in addition the fins 36 act essentially like wipers, exerting a ratchet type action so as to tend to prevent accidential longitudinal displacement of the holder 10 within such a hole 14. From this it will be apparent that the holding means 30 and 32 are both means for holding the pipe holder 10 by frictionally engaging a structural member.

The pipe holder 10 also includes rib means 38 on the internal surfaces 24 of the segments 18. These rib means 38 consist of parallel, spaced ribs 40 which extend from the internal surfaces 24 a short distance so as to be capable of frictionally engaging and yet being slid along the pipe 12. These rib means 38 are designed so as to space such a pipe 12 from the internal surfaces 24 in order to avoid or minimize heat and sound conduction from the pipe 12.

From a consideration of the drawing it will be realized that in a holder such as the holder 10 the segments 18 are arranged in an edge to edge relationship so as to extend in a generally cylindrical configuration which corresponds to the survature of the surfaces 24 and 26. In such a configuration flanges 42 on adjacent ends 20 of the segments 18 are located so as to extend from the exterior surfaces 26 in the same plane perpendicular to the axis of the segments 18. These flanges 42 are used for mounting purposes in positioning a holder 10 in a "proper" position by abutting against a structural member such as a stud 16. They may be integrally with the fins 34 for support purposes. Preferably they are adjacent to the fins 34 so as to fit against a support member when only the fins 34 are engaged with such a member.

These flanges 42 may conveniently be provided with nail holes 44 for use in securing the holder 10 to a stud 16 through the use of conventional nails 46. When the holder 10 is used horizontally the use of such holes 44 is a matter of choice. When the pipe holder 10 is to be used so as to extend vertically the nail holes 44 are not considered necessary since the flanges 42 will engage the upper surface of a structural member in order to support a holder 10.

Figure 5:
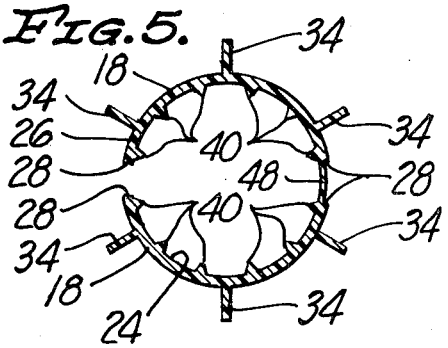
FIG. 5 is a cross-sectional view taken at line 5—5 in FIG. 4.

From an examination of the drawing it will be apparent that the two adjacent side edges 28 of the segments 18 as seen in the left in FIG. 5 are unattached, but that the other two adjacent side edges 28 of the segments 18 are connected by a small hinge means 48. This hinge means 48 is constructed as a flat, thin, flexible strap so as to permit the segments 18 to be moved with respect to one another to what is referred to herein as an open position. In this position these two segments 18 can be located relative to a pipe such as the pipe 12 so that they can be closed so as to surround this pipe 12. In order to permit such opening without the holding means 30 and 32 and the flanges 42 on the segment 18 hitting against one another, these flanges 42 and these holding means 30 and 32 are, as shown, spaced from the hinge means 48 an amount sufficient so that they will not abut against one another when the holder 10 is opened up.

An entire holder such as the holder 10 can be and is preferably formed as an integral unit by injection molding techniques out of a known polyolefin material such as polypropylene. Such a plastic material is electrically non-conductive and, hence, will hold a pipe such as the pipe 12 with respect to a metal structural member without allowing metal to metal contact such as would cause galvanic action. Further, when the pipe holder 10 is made of such material in this manner, the hinge means 48 is formed integrally with the other parts, holding down manufacturing costs. Such a hinge means, even if not completely a "live" type hinge means as can be created with polypropylene, will normally permit a holder 10 to be opened as described so as to be fitted around a pipe such as the pipe 12.

When so fitted around a pipe 12 the holder 10 may be slid along the pipe 12 so as to be inserted through a hole such as one of the holes 14 in the stud 16 with a minimum of difficulty. In such a position, depending upon the depth of the hole either the holding means 30 or both the holding means 30 and 32 will frictionally hold the holder 10 in place because of an interference between the fins 34 or the fins 34 and 36 and the interior of the hole. During this installation of a holder 10 there is substantially no way for a pipe such as the pipe 12 being damaged. In such an installed position a pipe 12 will be adequately supported or held in such a manner that the pipe 12 can expand and contract. However, the pipe 12 will also be supported within the interior of the holder 10 so that there is substantially no chance of any material amount of sound or heat being conducted from the pipe 12 to the structural member upon which the holder 10 is held. This is considered quite important.

The particular pipe holder 10 may easily be formed so that more than two of the segments 18 are used in it. This is considered to be advantageous when such a holder 10 is to be used with comparatively large diameter pipe. In a similar manner other modifications may be made in the structure of the holder 10. In theory such a holder 10 could be made as essentially a single cylinder split along its length, using a portion of the cylinder itself as a hinge means so as to permit opening and closing. Such a structure is not considered to be practical because of the amount of force required to spring such a cylinder open. One of the major advantages of the invention lies in the convenience of use. A factor contributing to this is the ease with which a holder such as the holder 10 may be applied to a pipe.

I claim:

1. A pipe holder for use in holding a pipe relative to a structural member which comprises a unitary body of a polyolefin polymer said body including:

a plurality of segments, each of said segments corresponding to a part of a cylinder and having (a) ends, (b) an internal cylindrically shaped surface, (c) an external cylindrically shaped surface, (d) side edges, (e) a flange on one of said ends extending outwardly from said external surface, (f) holding means for engaging a structural member, said holding means being located on said external surface so as to extend outwardly therefrom, (g) rib means for engaging and holding a pipe so such a pipe is spaced from said internal surface, said rib means being located on said internal surface so as to extend therefrom so as to extend in a direction between the ends thereof, said segments being arranged in edge to edge relationship so as to extend in a cylindrical configuration with said flanges being located on adjacent ends of said segments, a flat, thin, flexible strap hinge means connecting the adjacent edges of said segments except for two of said edges, said hinge means permitting said segments to be opened along said two edges to a position in which said segments can be placed around a pipe, said flanges being adapted to be secured to a structural member so as to hold said holder in place, said flanges and said holding means adjacent to said hinge means being spaced from said hinge means an amount sufficient to permit said segments to be opened without interference between flanges and holding means on adjacent of said segments, said holding means on each of said segments comprising two sets of fins, one set extending longitudinally along part of the length of the segment upon which it is located and the other set extending circumferentially around the segment upon which it is located, the longitudinally extending fins on said segments being located adjacent to said flanges, all of said fins extending the same distance from the surfaces upon which they are located.

* * * * *